US011948733B2

(12) United States Patent
Li et al.

(10) Patent No.: US 11,948,733 B2
(45) Date of Patent: Apr. 2, 2024

(54) PROCESSING OF ANISOTROPIC PERMANENT MAGNET WITHOUT MAGNETIC FIELD

(71) Applicant: FORD GLOBAL TECHNOLOGIES, LLC, Dearborn, MI (US)

(72) Inventors: Wanfeng Li, Novi, MI (US); Chuanbing Rong, Canton, MI (US); Franco Leonardi, Dearborn Heights, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 664 days.

(21) Appl. No.: 16/746,116

(22) Filed: Jan. 17, 2020

(65) Prior Publication Data

US 2021/0225586 A1 Jul. 22, 2021

(51) Int. Cl.

*H01F 41/02* (2006.01)
*H01F 1/055* (2006.01)
*H01F 1/057* (2006.01)
*H01F 1/059* (2006.01)

(52) U.S. Cl.

CPC ....... *H01F 41/0273* (2013.01); *H01F 1/0556* (2013.01); *H01F 1/0576* (2013.01); *H01F 1/059* (2013.01); *H01F 41/0266* (2013.01)

(58) Field of Classification Search

None

See application file for complete search history.

(56) References Cited

U.S. PATENT DOCUMENTS

| | | | |
|---|---|---|---|
| 4,985,085 | A | 1/1991 | Chatterjee |
| 5,026,438 | A | 6/1991 | Young et al. |
| 10,109,418 | B2 | 10/2018 | Cui et al. |
| 2003/0211000 | A1 | 11/2003 | Chandhok |

(Continued)

FOREIGN PATENT DOCUMENTS

| | | | |
|---|---|---|---|
| JP | 64010603 A | * | 1/1989 |
| JP | 10022111 A | * | 1/1998 |

OTHER PUBLICATIONS

Morimoto, J. Alloys and Compounds, vol. 393, p. 311-315. (Year: 2005).*

(Continued)

*Primary Examiner* — Xiaowei Su
(74) *Attorney, Agent, or Firm* — David B. Kelley; Brooks Kushman P.C.

(57) ABSTRACT

A method of processing an anisotropic permanent magnet includes forming anisotropic flakes from a hulk magnet alloy, each of the anisotropic flakes having an easy magnetization direction with respect to a surface of the flake and combining the anisotropic flakes with a binder to form a mixture. The method further includes extruding or rolling the mixture without applying a magnetic field such that the easy magnetization directions of the anisotropic flakes align to form one or more layers having a magnetization direction aligned with the easy magnetization directions of the anisotropic flakes, and producing the anisotropic permanent magnet from the layers having the magnetization direction such that the anisotropic permanent magnet has a magnetization with a specific orientation.

10 Claims, 4 Drawing Sheets

(56) References Cited

U.S. PATENT DOCUMENTS

| | | | | |
|---|---|---|---|---|
| 2005/0081961 | A1* | 4/2005 | Yamashita .......... | H01F 41/0266 148/301 |
| 2012/0019342 | A1* | 1/2012 | Gabay .................. | H01F 1/0571 419/33 |
| 2014/0132376 | A1* | 5/2014 | Jin ........................ | H01F 1/0573 75/346 |
| 2015/0084727 | A1* | 3/2015 | Ozeki ..................... | H01F 1/086 264/611 |

OTHER PUBLICATIONS

Machine translation JP H1022111A. (Year: 1998).*
Machine translation of JPS6410603A. (Year: 1989).*

* cited by examiner

PROCESSING OF ANISOTROPIC PERMANENT MAGNET WITHOUT MAGNETIC FIELD

TECHNICAL FIELD

The present disclosure relates to permanent magnets, and particularly to processing anisotropic permanent magnets.

BACKGROUND

Permanent magnets have many applications, for example, in motors, generators, and other magnetic devices.

For most uses, the magnets generate magnetic field in desired directions. Anisotropic magnets are typically used in instances where improved performance and stronger magnetic fields are needed. The anisotropic magnets are conventionally prepared by aligning the magnetic powders in the presence of a magnetic field, followed by conventional consolidation steps. Factors that affect the alignment of the grains of the permanent magnetic include the achievable field intensity, powder shapes, and as well as other factors. Furthermore, the shape of the conventionally prepared permanent magnets are limited to cylinders, cubes, and other regular shapes with fixed orientations. Thus, flexibility in controlling the shape and easy magnetization direction of the permanent magnet may improve the performance and efficiency of magnetic devices. Although advances in material processing, such as additive manufacturing and other new processing techniques, have made producing complex shapes less difficult, flexibility in controlling the magnetization direction is still challenging.

SUMMARY

According to one or more embodiments, a method of processing an anisotropic permanent magnet includes forming anisotropic flakes from a bulk magnet alloy, each of the anisotropic flakes having an easy magnetization direction with respect to a surface of the flake and combining the anisotropic flakes with a binder to form a mixture. The method further includes extruding or rolling the mixture without applying a magnetic field such that the easy magnetization directions of the anisotropic flakes align to form one or more layers having a magnetization direction aligned with the easy magnetization directions of the anisotropic flakes, and producing the anisotropic permanent magnet from the layers having the magnetization direction such that the anisotropic permanent magnet has a magnetization with a specific orientation.

According to at least one embodiment, the binder may be an epoxy, lubricant or a ductile alloy powder. In one or more embodiments, the method may further include pressing the layers to further align the flakes. Although a magnetic field is not necessary for the anisotropic magnet, in certain embodiments, it may be employed before extrusion to form particular magnetization directions or a particular magnetization direction distribution. In at least one embodiment, the bulk magnet alloy may be Nd-Fe-B, Sm-Fe-N, Sm-Co, Al-Ni-Co, Ferrite, or Mn-Bi. In certain embodiments, the forming may include molting and solidifying of the bulk anisotropic magnet. In some embodiments, where the bulk anisotropic magnet may be Al-Ni-Co or Mn-Bi, the solidification may be a rapid solidification process followed by annealing. In other embodiments, where the bulk anisotropic magnet may be Nd-Fe-B, Sm-Fe-N, or Sm-Co, the solidification may be a directional solidification or milling, one or more embodiments, the producing may include machining the layers, stacking the layers, pressing the layers, bending the layers, or combinations thereof to adjust the specific orientation. In at least one embodiment, extruding the mixture may include aligning the surface of the anisotropic flakes parallel to an extruding surface. In some embodiments, rolling the mixture may include aligning the surface of the anisotropic flakes parallel to a rolling surface.

According to one or more embodiments, a method of processing an anisotropic permanent magnet includes brining anisotropic flakes from a bulk magnet alloy, the anisotropic flakes each having an easy magnetization direction, and combining the anisotropic flakes with a binder to form a mixture. The method further includes extruding or rolling the mixture without applying a magnetic field to form one or more anisotropic layers of anisotropic flakes having a collective magnetization direction based on the easy magnetization directions, and producing the anisotropic permanent magnet from the layers having the collective magnetization direction such that the anisotropic permanent magnet has a magnetization with a specific orientation.

According to at least one embodiment, the bulk anisotropic magnet may be Nd-Fe-B, Sm-Fe-N, Sm-Co, Al-Ni-Co, Ferrite, or Mn-Bi. In one or more embodiments, the producing may include machining the layers, stacking the layers, pressing the layers, bending the layers, or combinations thereof to adjust the specific orientation. In some embodiments, where the bulk anisotropic magnet may be Al-Ni-Co or Mn-Bi, the solidification may be a rapid solidification process followed by annealing. In other embodiments, where the bulk anisotropic magnet may be Nd-Fe-B, Sm-Fe-N, or Sm-Co, the solidification may be a directional solidification or milling. In certain embodiments, the method may further include sintering the magnet to remove the binder to increase an intensity of the fixed magnetic field without changing the collective magnetization direction. According to at least one embodiment, the binder may be an epoxy, lubricant or a ductile alloy powder.

According to one or more embodiments, an anisotropic permanent magnet includes one or more layers of magnetic anisotropic flakes, each of the magnetic anisotropic flakes having an easy magnetization direction, wherein each of the layers has a respective magnetization direction aligned with the easy magnetization directions of the magnetic anisotropic flakes such that the anisotropic permanent magnet has a magnetization with a specific orientation or orientation distribution based on the respective magnetization directions.

According to at least one embodiment, the magnetic anisotropic flakes may be Nd-Fe-B, Sm-Fe-N, Sm-Co, Al-Ni-Co, Ferrite, or Mn-Bi. In one or more embodiments, the at least one layer may include a binder mixed with the anisotropic flakes, the binder being an epoxy, a lubricant, or a ductile alloy powder.

DETAILED DESCRIPTION

As required, detailed embodiments of the present invention are disclosed herein; however, it is to he understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to an embodiment, a method of controlling the easy magnetization direction, or interchangeably the magnetization direction, during the formation of a permanent magnet without using a magnetic field is disclosed. Without requiring a magnetic field, more complicated shaped magnets can be prepared with controlled distributions of magnetization orientation.

Figure 1:
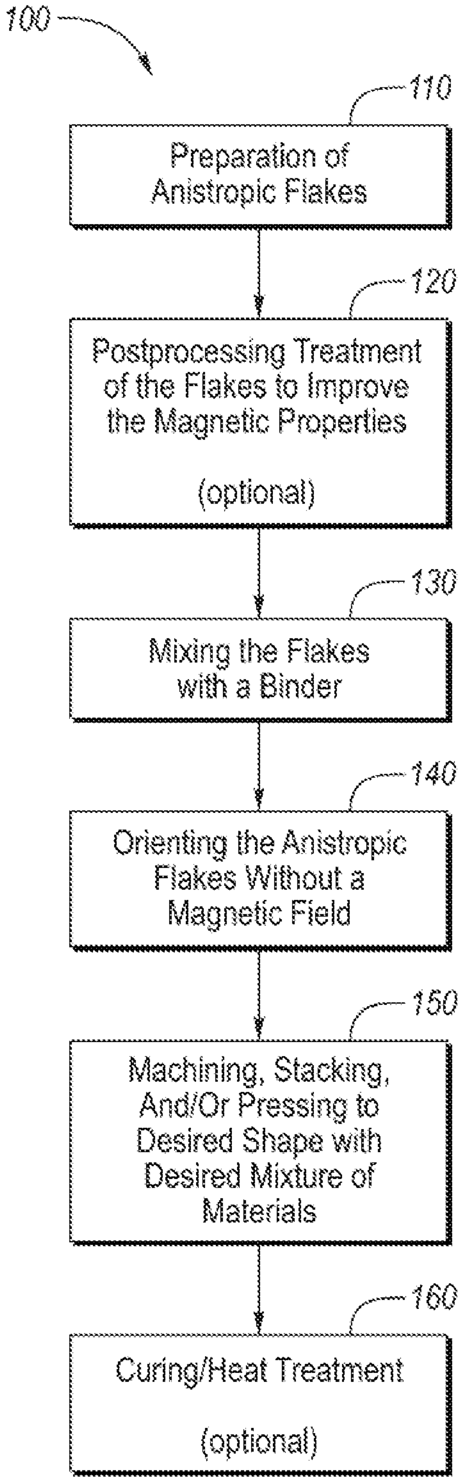
FIG. 1 is a flow chart of a method of forming a permanent magnet with an aligned magnetization direction, according to an embodiment.

Referring to FIG. 1, the method 100 includes step 110 of preparing anisotropic permanent magnet flakes. The anisotropic permanent magnet flakes are flakes with their shape linked to the easy magnetization direction of the bulk magnet instead of being distributed randomly. For permanent magnet alloys, like, for example, Nd-Fe-B, Sm-Co, and Ferrite, the magnetic phases have an anisotropic crystal structure, meaning there is one axis that is unique. As a result, physical properties along this axis differ from physical properties along other directions. For example, when grinded to form a powder or flakes, the alloys are generally easily broken from directions perpendicular to this axis, and during solidification, the growth rate along this unique axis is different from along other directions. Breaking down the magnet and solidification can be used to develop anisotropic flakes with properties similar to the bulk magnet alloy by controlling the processing parameters. One way to prepare anisotropic flakes is by controlled solidification as the growth rate along the easy magnetization direction is different from other directions. The magnetic flakes can be prepared by controlling the temperature gradient and cooling rate. For this approach, a higher ratio of rare earth elements than stoichiometrically needed is required to prevent the formation of soft magnetic powders. Any suitable conventional processing technique or novel technique, e.g., additive manufacturing method can he used to prepare the flakes.

Figure 2:
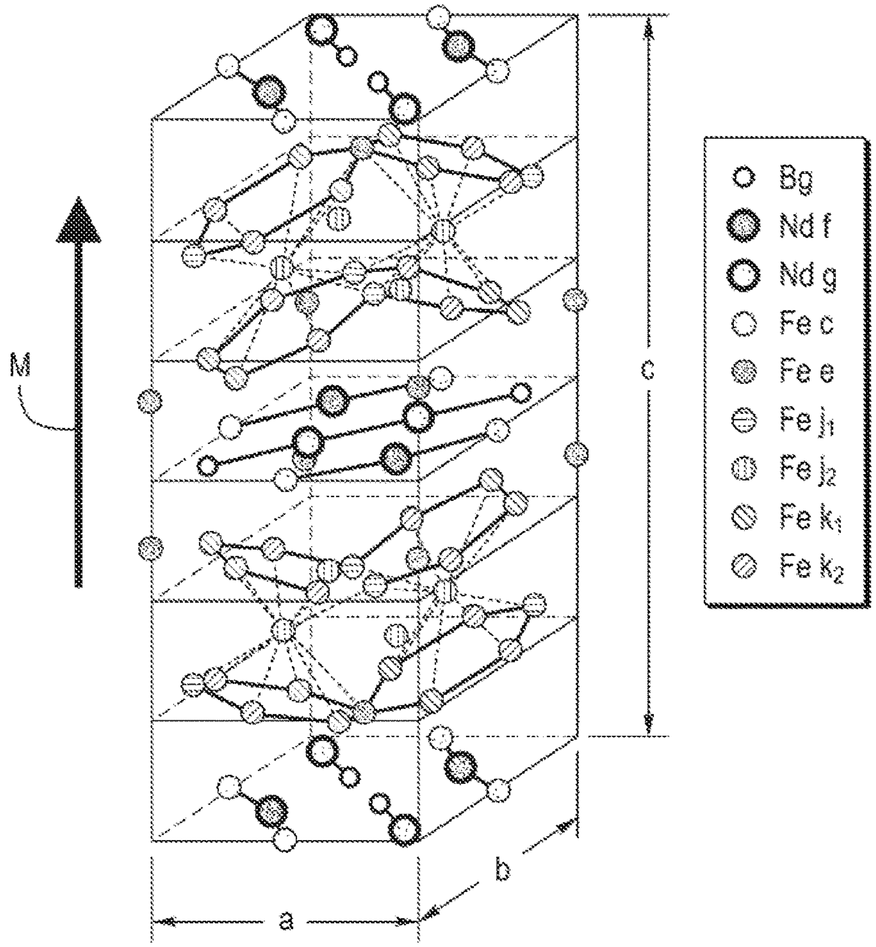
FIG. 2 is a schematic illustration of a crystal structure of a $Nd_2Fe_{14}B$ permanent magnet with an easy magnetization direction.
Figures 3A, 3B, 3C:
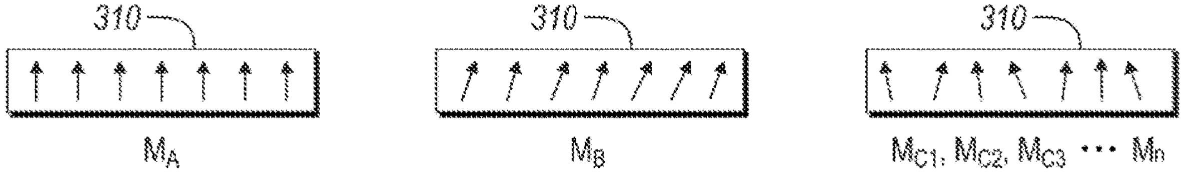
FIGS. 3A-C are schematic illustrations of anisotropic flakes with aligned magnetization directions, according to embodiments.

Referring to FIG. 2, the easy magnetization direction M is shown for a $Nd_2Fe_{14}B$ structure. Structures of $SmCo_5$, $Sm_2Co_{17}$, MnBi, and ferrite have a similar axis and easy magnetization direction. Due to the symmetry of the crystal structure of permanent magnetic phase 100, grain growth during solidification is anisotropic, and as such, the mechanical properties are also anisotropic. Thus, anisotropic flakes can be prepared at step 110 by directional solidification by controlling of direction gradient to promote the anisotropy. To make the easy magnetization direction M perpendicular to the surface of the flakes, for example, the temperature gradient during cooling can be controlled to be perpendicular to the surface while minimizing the temperature gradient in the lateral direction. This way the alloy will grow only toward the surface direction, and the resultant flakes would be anisotropic. In various embodiments, as shown in FIGS. 3A-C, the easy magnetization direction may vary with respect to a surface 310 of the layer. In some embodiments, the magnetization direction $M_A$, shown in FIG. 3A, may be substantially perpendicular to the surface 310, in another embodiment, as shown in FIG. 3B, the magnetization direction $M_B$ may be at an angle with the surface 310, and in yet another embodiment as shown in FIG. 3C, have varying magnetization directions $M_{C1}$, $M_{C2}$, and so on ($M_{CX}$) at different angles with the surface 310.

Alternatively, the anisotropic permanent magnet flakes can also be made at step 110 by a top-down method. The top down method includes breaking the bulk magnet into thin flakes, with the bulk magnet being single crystalline or at least anisotropic. The bulk alloys can be milled because, as similar to above, the mechanical properties of permanent magnet materials are also anisotropic, during grinding, the alloys are easier to be sliced along the interface that is perpendicular to the easy magnetization direction. In embodiments where the bulk permanent magnet material is Nd-Fe-B, Sin-Fe-N, or Sm-Co, the flakes can be prepared by melting and directional solidification/milling. The flakes can also be prepared at step 110 by chemical/physical deposition method. Similar to the solidification method, the growth rate difference along the different axis would lead to anisotropic flakes when processing parameters are controlled properly.

Referring again to FIG. 1, an option post-processing step 120 may be conducted to improve the magnetic properties of the anisotropic flakes. For example, the flakes of Al-Ni-Co or Mn-Bi material may be annealed in a magnetic field to achieve the flakes with the specific magnetization direction. In certain embodiments, such as with Nd-Fe-B or Sm-Fe alloy flakes, the flakes my require additional treatment such as, but not limited to grain boundary diffusion or nitrogenization. In embodiments where the bulk permanent magnet material is Al-Ni-Co or Mn-Bi, the flakes can be prepared by melting and rapid solidification.

At step 130, the anisotropic flakes are mixed with a binder to form a mixture. The binder may be an epoxy or a lubricant, and may be included in a suitable quantity. The binder may further be, in some embodiments, a ductile alloy powder. Notably, the powder to binder ratio does not affect the alignment of the flakes as it does in conventional bonded magnets because the alignment occurs in step 140 without a magnetic field.

Figure 4A:
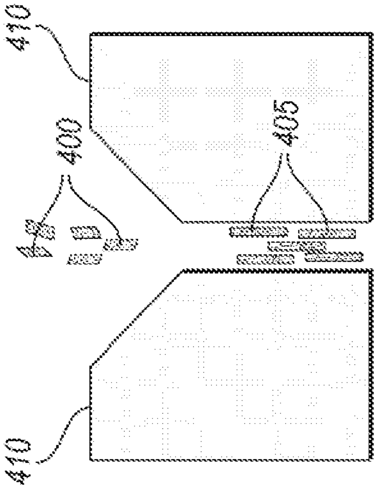
FIGS. 4A-C are schematic illustrations of flake alignments, according to embodiments.
Figure 4B:
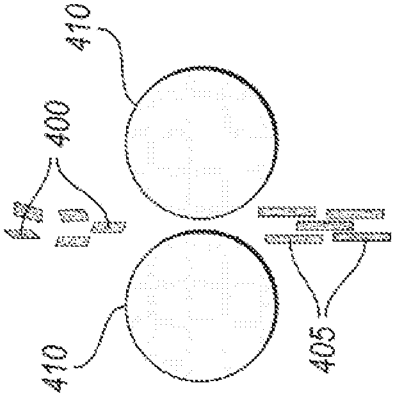
Figure 4C:
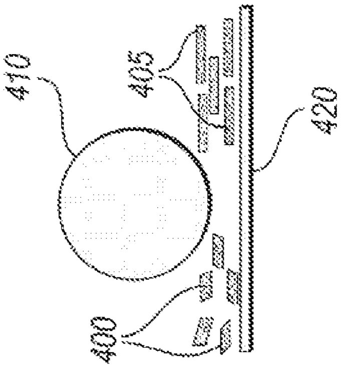

The method further includes orienting the flakes at step 140 according to the desired magnetic field of the resulting magnet based on the easy magnetization direction of the flakes. Because the orientation of the flakes is fixed, the easy magnetization direction of the resulting magnet is also fixed without requiring exposure to a magnetic field to align the grains of the flakes. By controlling the orientation of the flakes, the easy magnetization direction can. be controlled, and thus the magnetic field generated by the magnet can be modulated according to design requirement. Referring to FIGS. 4A-C, mechanisms for step 140 are shown to orient the flakes 400 without a magnetic field, such that the mixture (of binder and flakes) is extruded or rolled. The extrusion or rolling is done by rollers or wheels 410. As such, extrusion, or rolling can align the flakes 400 into aligned layer 405. In certain embodiments, as shown in FIG. 4C, the surface of the flakes 400 would be aligned to be parallel to the surface 420 upon which the stress is applied from the machinery 410. Because of the orientation relation between the surface of the flakes 400 and the easy magnetization direction of the magnet, the resultant magnet prepared from the aligned flakes 400 will be anisotropic. Thus, application of a magnetic field and heating of the flakes is an optional step to further align the flakes, but is not necessary.

Figure 5A:
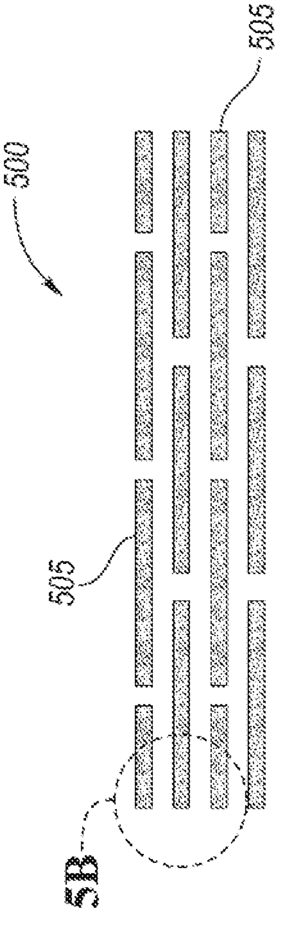
FIG. 5A is a schematic illustration of an aligned anisotropic magnet, according to an embodiment.
Figure 5B:
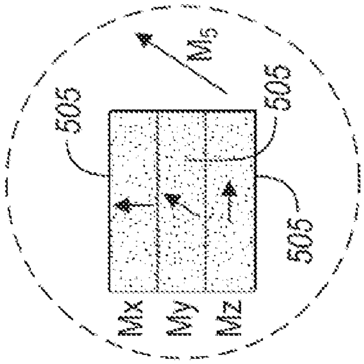
FIG. 5B is a partial enlarged schematic view of flakes of the anisotropic magnet of FIG. 5A.
Figure 6:
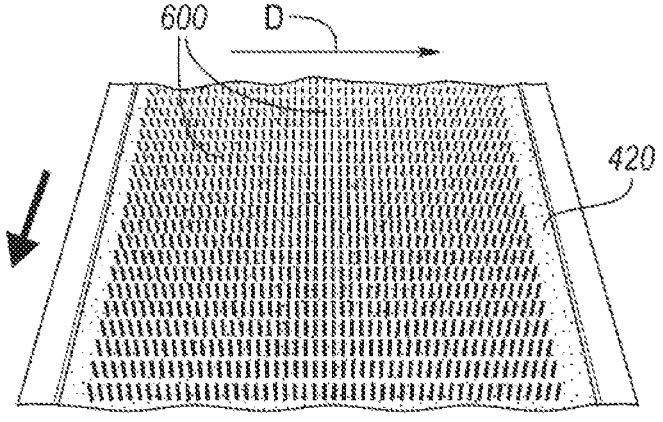
FIG. 6 is a schematic illustration of an aligned anisotropic magnet, according to an embodiment.

Referring to FIGS. 5A-B, aligned layer 500 includes aligned flakes 505 and an overall magnetization direction M 5 based on the easy magnetization directions $M_x$, $M_y$, and $M_z$, of flakes 505. Referring to FIG. 6, an example of flakes 600 as aligned during rolling is shown. in this example, flakes 600 were mixed with. epoxy and roiled (as in FIG. 4C), The flakes 600 tiller rolling are aligned along direction D, substantially parallel to the rolling surface 420 to form the aligned layer.

Figure 7A:
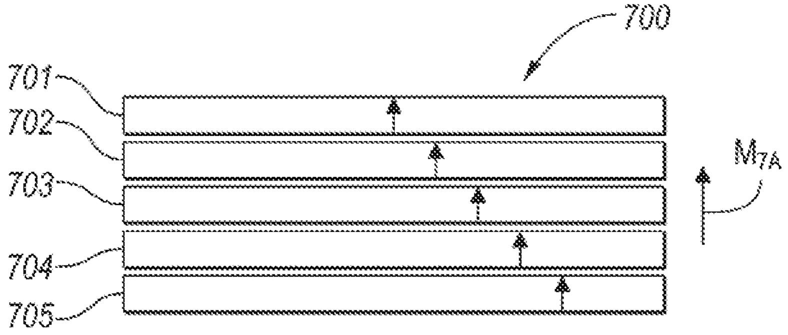
FIGS. 7A-C are schematic illustrations of anisotropic magnets with varying field directions, according to embodiments.
Figure 7B:
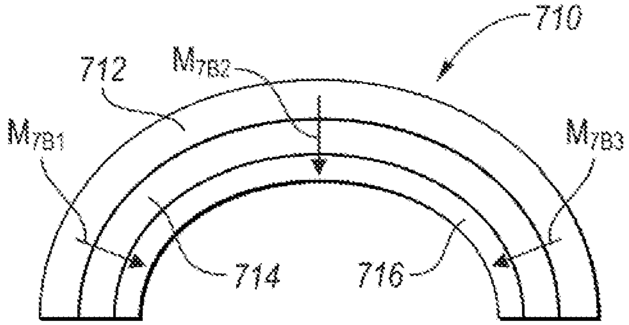
Figure 7C:
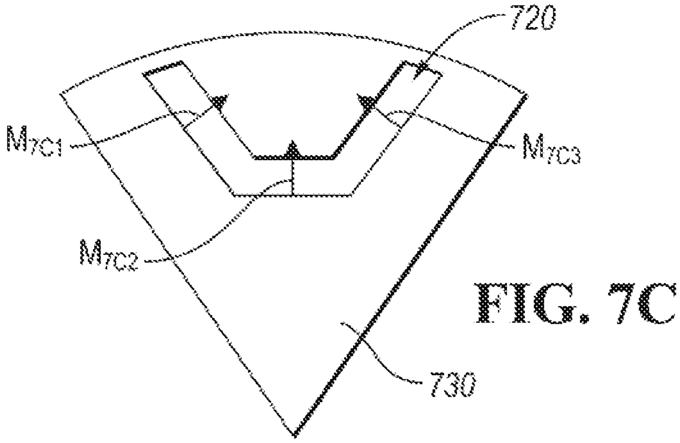

The method further includes preparing the final resultant magnet by stacking multiple layers of the aligned magnet layers at step 150. Final permanent magnets of different shapes can be prepared as the pressed sheets of aligned flakes can be machined into different shapes easily. The magnet can, for example, be rectangular 700 (FIG. 7A) with the aligned layers 701, 702, 703, 704, 705 having. magnetization direction $M_{7A}$, or it can be an arc-shaped 710 (FIG. 7B) with layers 712, 714, 716 each. having a respective magnetization direction $M_{7B1}$, $M_{7B2}$, $M_{7B3}$, or a U or V-shaped magnet 720 (FIG. C) in a machine 730 slot to focus the flux of the magnet via magnetization directions $M_{7C1}$, $M_{7C2}$, $M_{7C3}$ at various regions based on the shape. Although the layers shown in FIGS. 7A-C are of similar materials, different layers may have different materials, and furthermore, in each layer, a mixture of different flakes can be used according to design requirements. As the orientation of the magnetization direction is determined by the surface orientation of each layer of the aligned flakes, the orientation of magnetization of the resultant magnet can be controlled by controlling the shape of the resultant magnet. Thus, the field orientation generated by the magnet can be controlled. Referring to FIG. 7B, for example, the aligned strips 700 of flakes are bent so that the resultant magnet can generate a magnetic field in radial direction $M_R$. Referring to FIG. 7C, in certain embodiments, for example for electric machine applications, a V-shaped magnet pockets 720 in interior permanent magnet (IPM) machines 730 may require unique magnet shapes. By forming the anisotropic flakes with specific alignment, and aligning them to form layers for the stacked resultant magnet, high performance anisotropic magnets can be prepared via stacking the layers to form the specific shape to fit in the V-shaped pocket 720.

Because of the flexibility of each of the aligned layers and control over stacking to form specific shapes, the magnetic field generated by the magnet can be controlled to meet various design requirements without additional processing, as compared with conventional methods. Although the magnetic fields of the stacked layered magnets are already aligned according to design requirements, in certain embodiments, to achieve higher field intensity, the resultant stacked magnet may be further sintered to barn out the epoxy or lubricant to increase the intensity of the magnetic field without changing the easy magnetization direction of the resultant magnet. The magnet may optionally undergo further processing at step 160, such has curing or heat treatment, for example, to remove the binder or improve the magnet properties.

According to one or more embodiments, a method for forming an anisotropic magnet without a magnetic field is disclosed. Furthermore, the anisotropic magnet can be of complex shapes and can be prepared with a controlled magnetization direction. The anisotropic magnet can further be either bonded or sintered according to design requirements. In bonded magnets prepared. according to the method, the powder to binder ratio is higher when compared with conventionally bonded magnets, and thus higher energy density due to high powder density. Furthermore, the powder, to binder ratio does riot affect the alignment of the flakes as it does in conventional bonded magnets.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of processing an anisotropic permanent magnet comprising:

forming anisotropic flakes from a bulk magnet alloy of Al-Ni-Co material, each of the anisotropic flakes having a selected orientation with an easy magnetization direction with respect to a surface of the flake;

combining the anisotropic flakes with a binder to form a mixture;

extruding or rolling the mixture without applying a magnetic field or any prior application of a magnetic field to align the anisotropic flakes such that the easy magnetization directions of the anisotropic flakes align via mechanical processing to form one or more layers having an overall magnetization direction aligned with the easy magnetization directions of the anisotropic flakes based on the selected orientation; and producing the anisotropic permanent magnet from the layers having the magnetization direction such that the anisotropic permanent magnet has a magnetization with a specific orientation.

2. The method of claim 1, wherein the binder is an epoxy, lubricant or a ductile alloy powder.

3. The method of claim 1, further comprising pressing the layers to further align the flakes.

4. The method of claim 1, wherein the forming includes melting and solidifying of the bulk magnet alloy.

5. The method of claim 1, wherein the producing includes machining the layers, stacking the layers, pressing the layers, bending the layers, or combinations thereof to adjust the specific orientation.

6. The method of claim 1, wherein extruding the mixture includes aligning the surface of the anisotropic flakes parallel to an extruding surface.

7. The method of claim 1, wherein rolling the mixture includes aligning the surface of the anisotropic flakes parallel to a rolling surface.

8. A method of processing an anisotropic permanent magnet comprising:

forming anisotropic flakes from a bulk magnet alloy of Al-Ni-Co material, the anisotropic flakes each having a selected orientation with an easy magnetization direction;

combining the anisotropic flakes with a binder to form a mixture;

extruding or rolling the mixture to align the mixture according to the selected orientation without applying a magnetic field to form one or more anisotropic layers of anisotropic flakes having a collective magnetization direction based on the easy magnetization directions;

producing the anisotropic permanent magnet from the layers having the collective magnetization direction such that the anisotropic permanent magnet has a magnetization with a specific orientation; and sintering the anisotropic permanent magnet to remove the binder to increase an intensity of the magnetization of the anisotropic permanent magnet without changing the collective magnetization direction.

9. The method of claim 8, wherein the producing includes machining the layers, stacking the layers, pressing the layers, bending the layers, or combinations thereof to adjust the specific orientation.

10. The method of claim 8, wherein the binder is an epoxy, a lubricant, or a ductile alloy powder.

* * * * *